US007162806B1

(12) United States Patent
Swiggart (10) Patent No.: US 7,162,806 B1
(45) Date of Patent: Jan. 16, 2007

(54) VIDEO SIGHTING SYSTEM

(76) Inventor: Travis Swiggart, 7440 Stevens Ridge Rd., Lincoln, NE (US) 68516

( * ) Notice: Subject to any disclaimer, the term of this patent is extended or adjusted under 35 U.S.C. 154(b) by 33 days.

(21) Appl. No.: 11/084,904

(22) Filed: Mar. 21, 2005

(51) Int. Cl.
*F41G 1/467* (2006.01)

(52) U.S. Cl. .......................... 33/265; 124/87; 348/373

(58) Field of Classification Search .................. 33/265, 33/266; 124/87, 88; 348/373, 375; 396/429
See application file for complete search history.

(56) References Cited

U.S. PATENT DOCUMENTS

| | | | | |
|---|---|---|---|---|
| 4,643,159 A | | 2/1987 | Ryan ......................... | 124/24 R |
| 4,835,621 A | * | 5/1989 | Black .......................... | 386/118 |
| 5,611,324 A | | 3/1997 | Kursinsky .................... | 124/86 |
| 6,192,614 B1 | * | 2/2001 | Cliburn ........................ | 42/106 |
| 6,286,796 B1 | | 9/2001 | Pugliesi .................... | 248/187.1 |
| 6,526,956 B1 | | 3/2003 | Hankins ....................... | 124/86 |
| 6,556,245 B1 | * | 4/2003 | Holmberg .............. | 348/333.01 |
| 6,623,182 B1 | * | 9/2003 | Tatera ........................ | 348/373 |
| 2005/0066950 A1 | * | 3/2005 | Yu .............................. | 124/45 |
| 2005/0246910 A1 | * | 11/2005 | Mowers ....................... | 33/266 |
| 2005/0268521 A1 | * | 12/2005 | Cox et al. ..................... | 42/130 |
| 2006/0005447 A1 | * | 1/2006 | Lenner et al. ................ | 42/111 |

* cited by examiner

*Primary Examiner*—G. Bradley Bennett
(74) *Attorney, Agent, or Firm*—Thomte, Mazour & Niebergall; Shane M. Niebergall (57) ABSTRACT

A sighting system is integrated with video gathering and recording capabilities. A video camera unit may be coupled in front of or behind a weapon's sights. In another embodiment, the weapon's sights are electronically generated by the video camera. Where a zoom lens is provided, software automatically adjusts the electronically generated sights based on any optical changes. A separate or integrated memory unit may also be provided. A range finder may be provided to supply range-to-target data.

17 Claims, 6 Drawing Sheets

VIDEO SIGHTING SYSTEM

BACKGROUND OF THE INVENTION

1. Field of the Invention

The present invention relates to sighting systems for weapons and more particularly to a selectively adjustable sighting system for a bow that incorporates the use of a video camera to view and selectively record sighting and shooting activities.

2. Description of the Prior Art

Sighting systems are a crucial component to any weapon used for hunting or target practice. Many different types of sighting systems are known to be used for firearms, bows, and the like. Oftentimes, however, setting the sighting system can be difficult when the individual who is using the weapon is inconsistent in their aiming or firing techniques. A second person may be needed to monitor the user's aiming and firing techniques in order to help the user properly sight the weapon and improve the manner in which it is being used. Even with a second person, however, the user does not have the benefit of watching his or her techniques first hand.

Hunters and individuals who are simply shooting at various practice targets may want to record their efforts. Some individuals may want to record the target prior to firing the weapon, some may want to record the target as it is being struck and some individuals may want to record the trajectory of the shot. Unfortunately, the prior art is inadequate in its attempts to resolve each of these needs with a single system. For example, bow and camera combinations are described in U.S. Pat. Nos. 5,611,324 and 4,643,159. However, these are single-shot cameras that simply take a before or after photograph of a target. Other, more complicated systems, such as U.S. Pat. No. 5,611,324 utilize a single-shot camera that is actuated by the release of an arrow from a bow to which the camera is mounted. Again, however, the single-shot aspect of the patented system is limited in its overall usefulness and fails to provide consistent benefits to the user. Other systems, such as U.S. Pat. No. 6,526,956 balance a video camera on the distal end of a vibration-dampening rod, which is secured to the forward end of a bow. In this particular system, the camera records the arrow trajectory after it is released from the bow. However, such a system is somewhat cumbersome and fails to capture the before, in-flight, and after aspects of the hunt. More importantly, the video camera is not integrated with the sighting mechanism of the bow in any manner. Accordingly, the system is of little benefit to the individual when sighting the weapon.

Accordingly, what is needed is a novel sighting system that incorporates the use of a video camera, enabling a user to record the events of a hunt before, during, and after actuation of a weapon. Such a system should also provide a user with valuable feedback when sighting the weapon before a hunt.

SUMMARY OF THE INVENTION

The video sighting system of the present invention is generally provided with a sight frame that is operatively coupled with a weapon, such as a bow. A video camera is operatively coupled with the sight frame and is provided with a lens system, an image receiving system and a viewfinder, which presents images of a target to a user. Sights are disposed within an imaging line-of-sight that extends from the target, through the forward and rearward ends of the video camera, to the user. In one preferred embodiment, the sights are coupled with the sight frame. The forward and rearward end portions of the video camera are, in a preferred embodiment, adapted to be operatively coupled with a rearward or forward mounting portion of the sight frame, respectively. Accordingly, the video camera may be positioned to simultaneously receive images of the target and the sighting system or receive images of the target alone.

In another preferred embodiment, the video camera is a digital video camera, having a charge-coupled device positioned adjacent the lens system for receiving the images. A memory means may also be provided for recording the images. In one embodiment, the memory means may be provided as a structure that is separate from the video camera, being disposed within a recorder unit which may also contain the power supply for the video camera and the memory means. In another preferred embodiment, the memory means may be integrated with the video camera and utilize a compact storage system, such as a memory card.

A processor may be incorporated with the sighting system, having software that is operative on the processor to generate the target images onto the viewfinder. The software may also be operative to generate sighting images on top of the target images, whereby the viewfinder provides both a means for sighting and for recording the target. A rangefinder may also be coupled with the video camera that is capable of transmitting range-to-target data to the processor. The software may generate the range-to-target data as an electrical image on top of the other images displayed on the viewfinder. The software may also provide a manner in which the user may adjust the video-displayed sights to change the targeting of the weapon. Automatic adjustments may be initiated by the software in accordance with zoom adjustments made by a user.

It is therefore a principal object of the present invention to provide a sighting system for a weapon that incorporates weapon sights with a video gathering and recording system.

A further object of the present invention is to provide a sighting system for a weapon that provides a video camera that may be removably mounted in front of or behind the sights.

Still another object of the present invention is to provide a sighting system for a weapon that incorporates electronic sights within a video system that is capable of gathering and recording images of a target.

Yet another object of the present invention is to provide a sighting system that incorporates a video and sighting unit with a separate power and memory unit that may be secured remotely from the weapon when in use.

A further object of the present invention is to provide a sighting system for a weapon that incorporates the use of the weapon's sights with a video gathering and range finding system.

Still another object of the present invention is to provide a sighting system for a weapon that is capable of capturing pre-shot images, trajectory images and post-shot images for a single shot of the weapon.

Yet another object of the present invention is to provide a video sighting system for weaponry that is relatively simple to implement and use.

These and other objects of the present invention will be apparent to those having skill in the art.

DESCRIPTION OF THE PREFERRED EMBODIMENT

In the following detailed description of exemplary embodiments, reference is made to accompanying FIGS. 1–7 which form a part hereof and show by way of illustration exemplary embodiments of the present invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense and the scope of the present invention is defined only by the appended claims.

The sighting system 10 of the present invention is preferably provided with a sight frame 12 that may be removably or permanently secured with the frame 14 of a bow 16. While the sighting system 10 of the present invention will be described herein as it may be used with a bow 16, it is contemplated that the sighting system 10 may be easily adapted for use with nearly any projectile weapon. A video camera 18, having a forward end portion 20 and a rearward end portion 22, is coupled with the sight frame 12. The use of the sight frame 12 permits the sighting system 10 to be used with a wide variety of bows 16 without significant modification to the bows 16. However, it is contemplated that the sight frame 12 may simply consist of fasteners for securing the video camera directly to the bow 16.

The video camera 18 is provided with a lens system 24 that, depending upon the desired operational characteristics of the video camera 18, will be comprised of one or more lenses, positioned adjacent the forward end portion 20 of the video camera 18. An image receiving means will be optically coupled with the lens system 24 for receiving images from the lens system 24. In a preferred embodiment, the image receiving means will be comprised of a small semiconductor image sensor 26, such as a charge-coupled device. The semiconductor image sensor 26 will receive the light focused by the lens system 24, measure the light along a plurality of photosites, and translate the measurements into electrical charges that may be displayed on a viewfinder 28. It is contemplated that the viewfinder may be provided in the form of small black-and-white or color tube-style monitors, LCD screens, plasma screens, or the like. In a preferred embodiment, the viewfinder 28 is positioned adjacent the rearward end portion 22 of the video camera 18 so that it may be easily viewed by the user when the setting system 10 is in use. The video camera 18 should be constructed, and coupled with the bow 16, such that it is provided with an imaging line-of-sight that extends between and through the forward and rearward end portions 20 and 22 of the video camera 18 to a target in front of the sighting system 10 and a user, who is positioned behind the sighting system 10.

A sighting means should be disposed within the imaging line-of-sight that permits the user to aim the bow 16 at a target. Many different types of sights may be used within the present invention. For example, a traditional system of pin sights 30, such as those depicted in FIG. 4 may be used. The pin sights 30 may be luminescent, using a radio active material or light-emitting system such as a fiber optic light. Non-luminescent pins, sighting loops, crosshairs, and the like, are also contemplated. Regardless of the type of sights used, it will be preferred that the sights be selectively adjustable in their position with respect to the bow 16. For example, the pin sights 30 are operatively secured with the sight frame 12 so that they may be selectively moved in X and Y axes and then secured in place.

Where such traditional sights are used, it is contemplated that the video camera 18 will be adapted to be secured to the sight frame 12 in optional positions in front of and behind the sights. In the examples depicted in FIGS. 5 and 6, the video camera 18 is provided with a forward collar 32 and a rearward collar 34 at its forward end portion 20 and rearward end portion 22, respectively. The forward collar 32 and rearward collar 34 should be configured to releasably engage the sight frame 12, adjacent the sights 30. In the examples depicted, the forward collar 32 is shaped to be coupled with a rearward mounting portion 36 of the sight frame 12. A locking pin 38 may be provided to releasably extend through a locking hole 40 to secure the sight frame 12 and the video camera 18 with one another. In this position, images of a target pass through the sites 30 and are then gathered by the video camera 18. Accordingly, the viewfinder 28 will depict an image of the target with an image of the sights 30 disposed thereon.

When it is not desirable to have images of the sights 30 displayed as an image on the viewfinder 28, the video camera 18 may be positioned so that the rearward collar 34 is coupled with a forward mounting portion 42 of the sight frame 12. As discussed previously, a locking pin 38 and locking hole 40 may be used to engage with one another and secure the video camera 18 with respect to the sight frame 12. In this position, the sights 30 are disposed in front of the viewfinder 28. Accordingly, the sites 30 remain in the imaging line-of-sight, as viewed by the user but the sights 30 will not be received as a part of the image gathered by the video camera 18. While it is contemplated that the video camera 18 may be permanently secured with the sight frame 12 in either such position, removability of the video camera 18 provides a greater degree of flexibility and use for the sighting system 10.

In another preferred embodiment, traditional sighting structures such as the pin sights 30 are not used. Rather, the sighting means are provided as a graphic image 31 on the viewfinder 28 over the image of the target received by the video camera 18. Software should be provided that is operative on a processor within the video camera to generate the graphic sights 31, much in a manner similar to other graphic images currently used in the art to advise a video camera user of battery power, tape duration, and the like. However, the graphic sites 31 should be generated by the software in a manner that permits them to be moved in X and Y axes across the viewfinder 28 so that a user may properly set the sights of the bow 16. In order to receive movement input from a user, one or more buttons or other known actuation means may be coupled with the exterior of the video camera 18 or a remote actuation device.

It is contemplated that the lens system 24 may further comprise a zoom lens to selectively increase the focal length of the lens system 24. It is also contemplated, that the software provided with the video camera 18 could be operative on the processor to provide a digital zoom option. However, where a zoom option is provided, regardless of the type of zoom mechanism used, it will also be important for the software to be able to automatically adjust the position of the graphic sites that it generates on the viewfinder 28. Preferably, a simple algorithm will be incorporated within the software to properly make the ratio adjustments for the number of times that the image is magnified and the vertical distance that the graphic sights will need to travel.

It may also be desirable to provide the video camera 18 with a range finder that is electrically coupled with the video camera 18 to transmit range-to-target data to the processor. Specifically, the range finder may comprise basic elements capable of transmitting an infrared beam to the target and receive the beam's reflection. The processor will be provided with software capable of calculating the amount of time it takes the beam to reach the target and return. Additional calculations, based upon the speed of light can be made to derive the range data. The range data may then be presented as a graphic, similar to the graphic sights, on the viewfinder 28. Additionally, the range finder will serve to provide necessary information for an auto focus function of the lens system 24, where such a feature is desirable.

Figure 1:
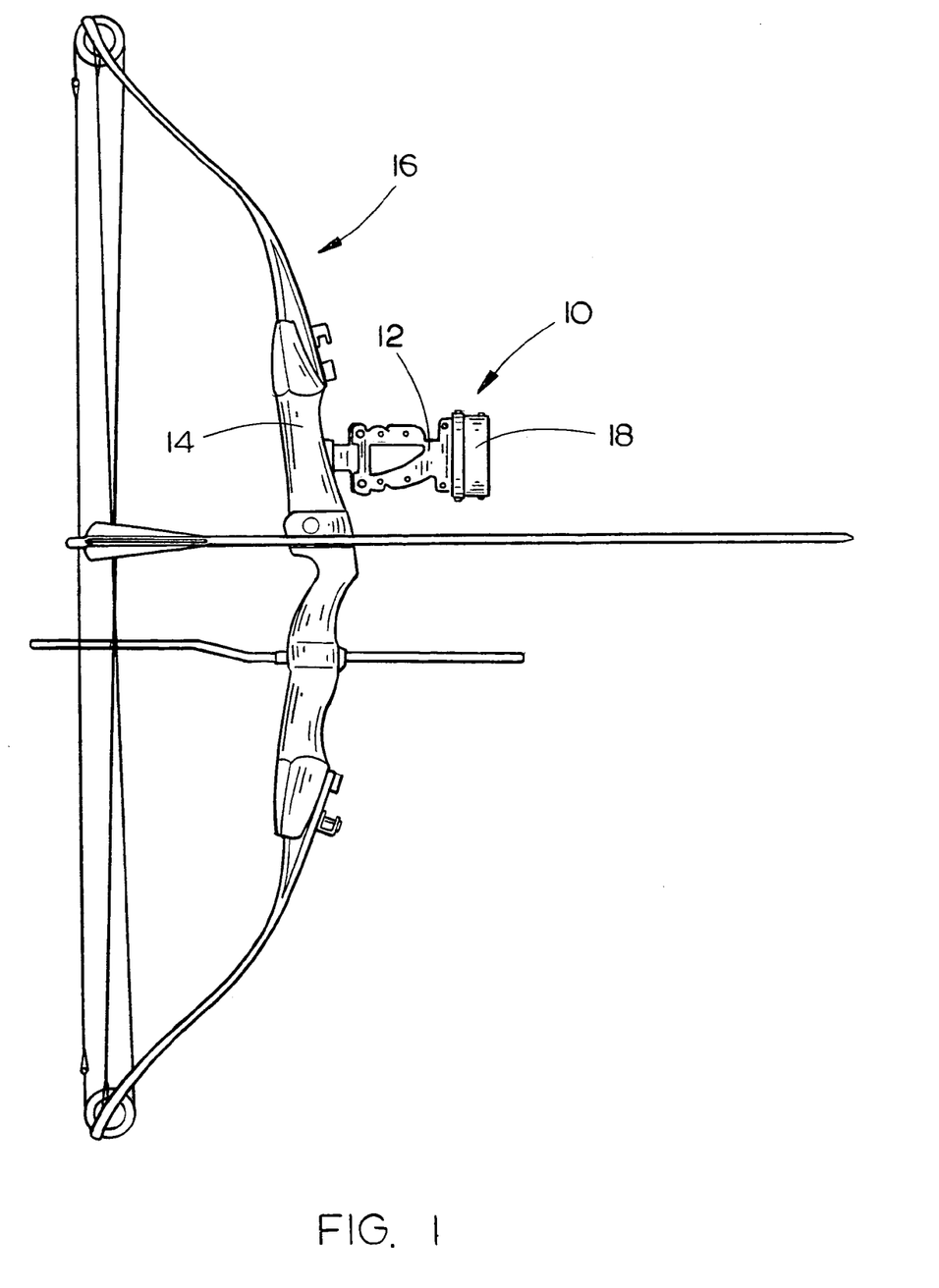
FIG. 1 is a side elevation view of one embodiment of the video sighting system of the present invention as the same could be used with a bow.
Figure 2:
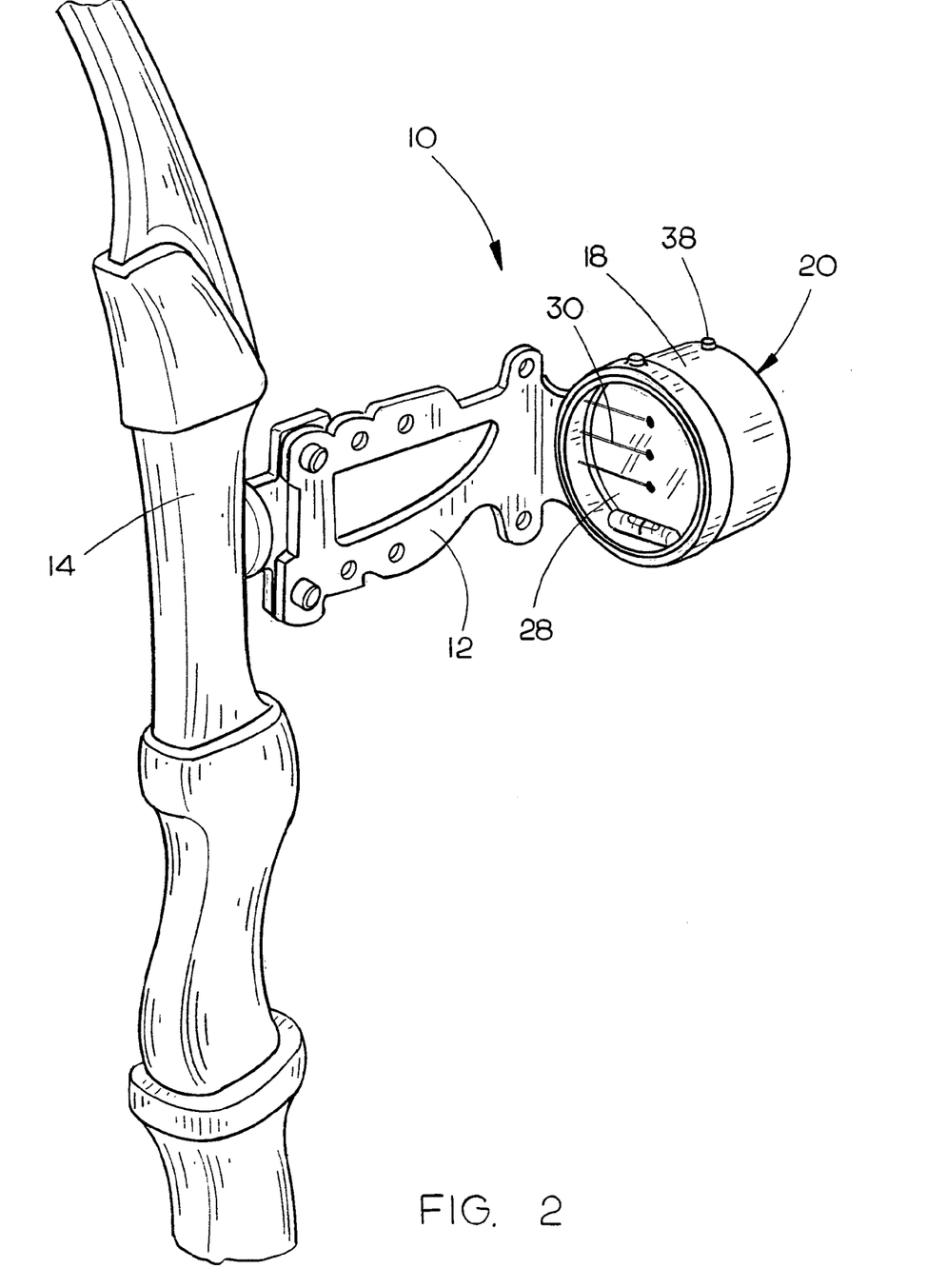
FIG. 2 is an isometric view of the video sighting system depicted in FIG. 1.
Figure 3:
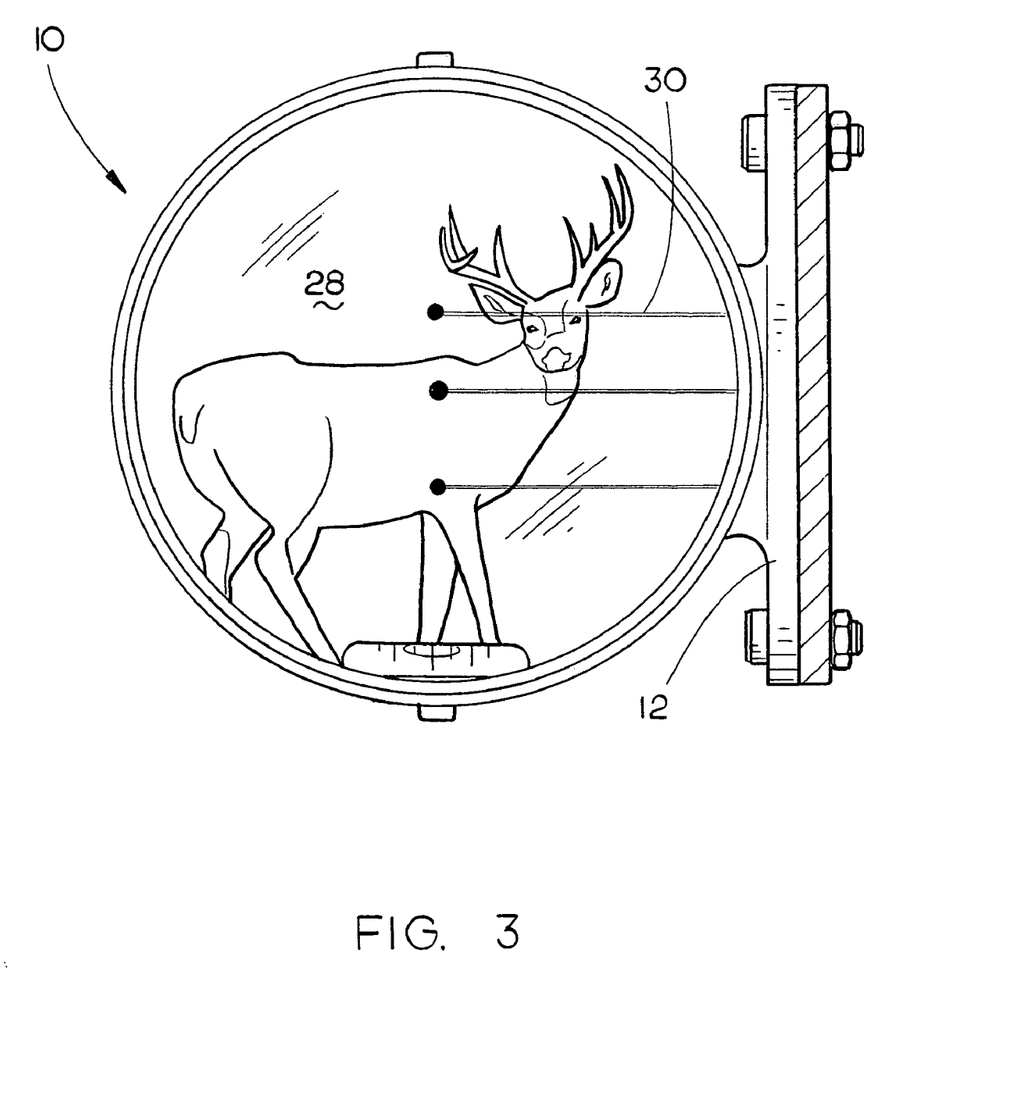
FIG. 3 is a front elevation view of one embodiment of the video sighting system of the present invention, demonstrating one manner in which the images of the target and the sights may be simultaneously viewed.
Figure 4:
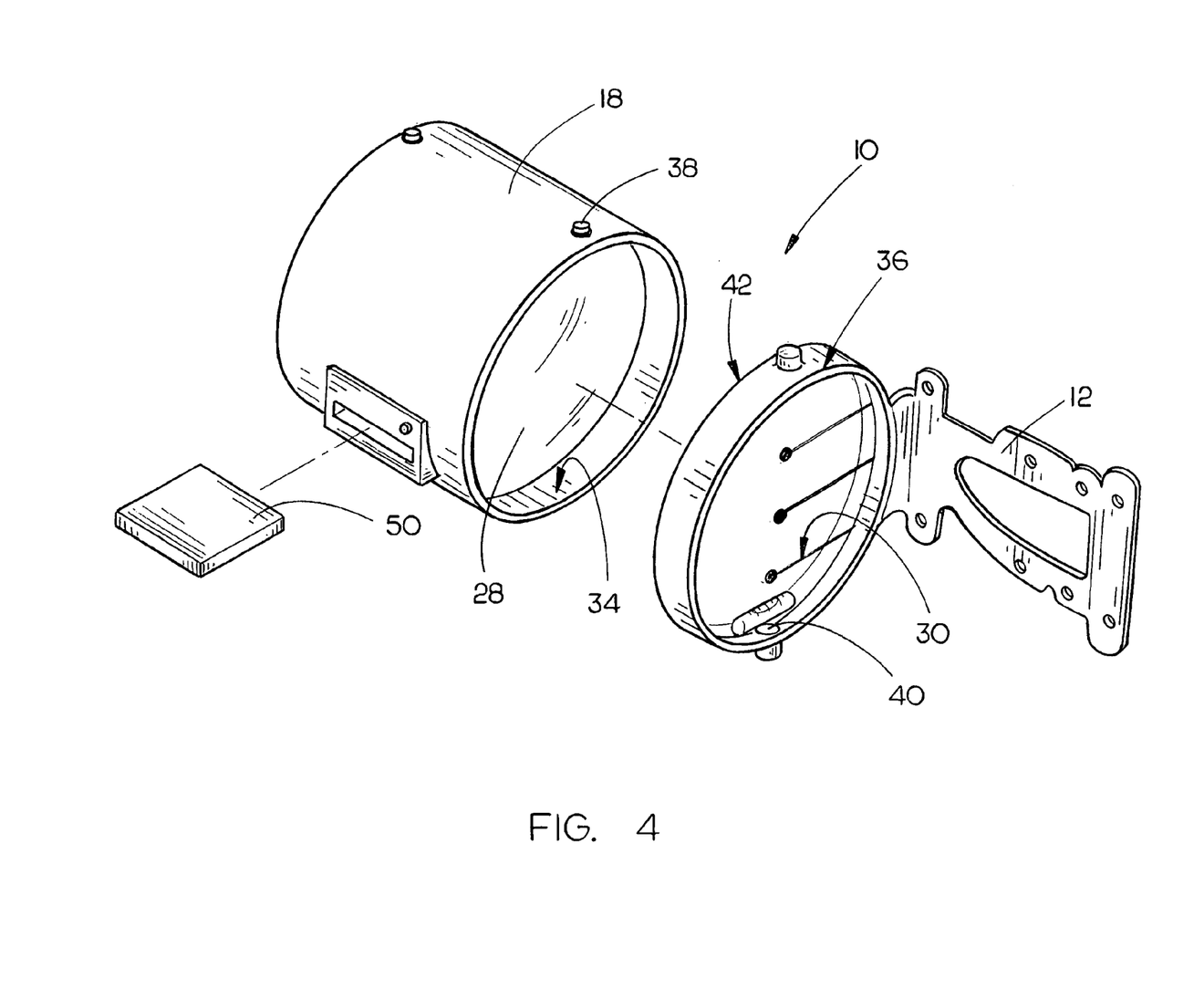
FIG. 4 is a partially exploded, isometric view of one embodiment of the video sighting system of the present invention.
Figure 5:
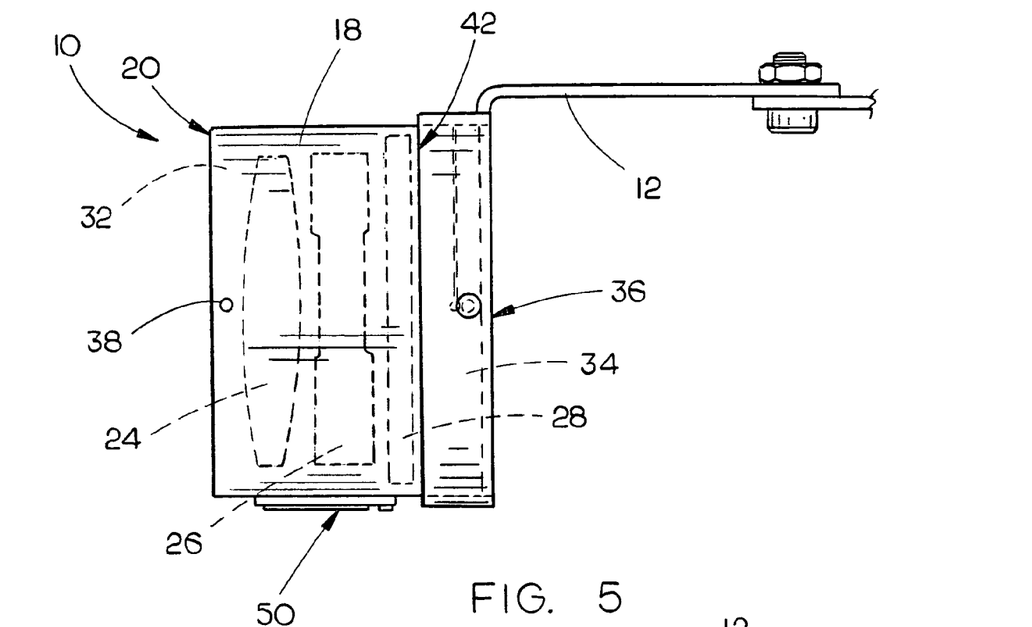
FIG. 5 is a plan view of one embodiment of the video sighting system of the present invention that depicts the video camera coupled in front of the sights.
Figure 6:
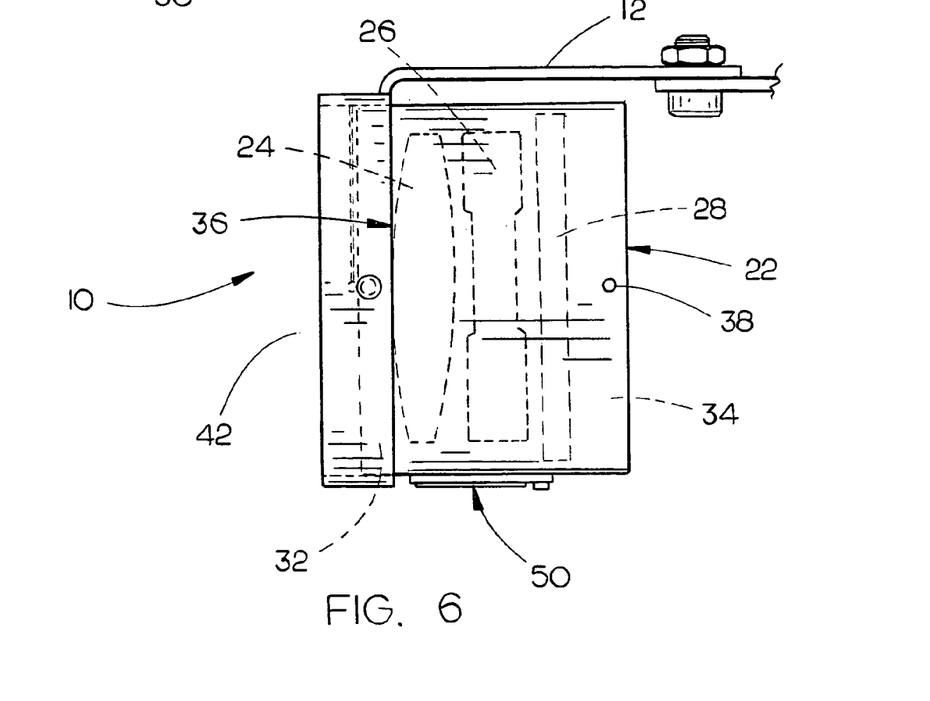
FIG. 6 is a plan view of the video sighting system of the present invention depicting the video camera as it could be coupled behind the sights.
Figure 7:
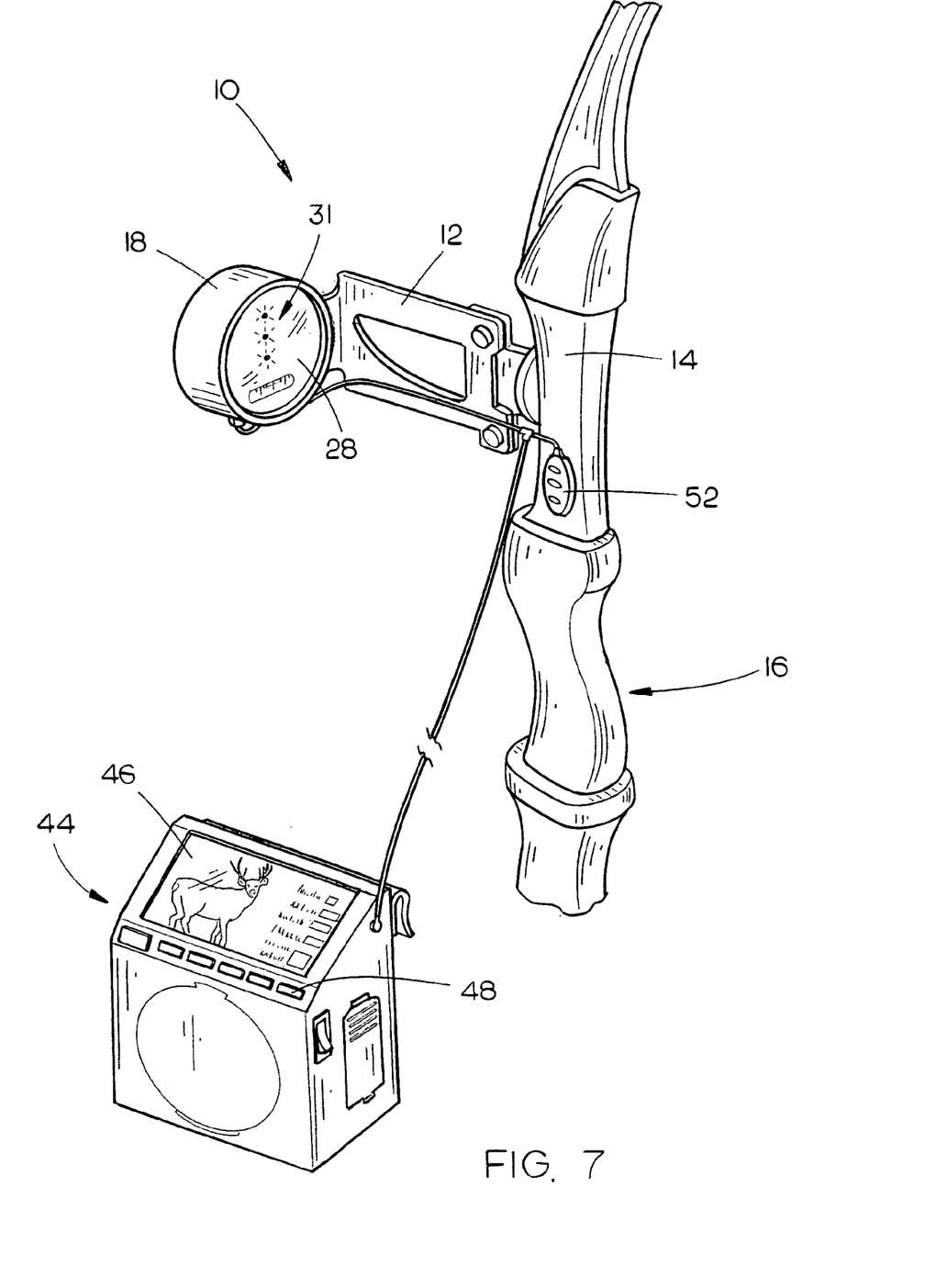
FIG. 7 is an isometric view of still another embodiment of the video sighting system of the present invention and an optional recorder unit that may be coupled thereto.

A memory means may also be provided for use with the sighting system 10. It is contemplated that the memory means may be a separate structure, such as a recorder unit 44 that may be sized and configured to be worn on the belt or other location of the user. The recorder unit 44 may be provided with a secondary viewfinder 46 to display all or some of the images displayed on the primary viewfinder 28. The recorder unit 44 may also include a power supply, such as batteries and/or an input to receive electricity from a remote source, such as a generator or the like. It is contemplated that the video camera 18 could be provided in an analog format. Accordingly, the recorder unit 44 may be supplied with the necessary components for known recording formats, including (but not limited to) standard VHS, VHS-C, Super VHS, Super VHS-C, 8 mm, and Hi-8. Likewise, where the video camera is provided in a digital format, the recorder unit 44 may be set up to record in different formats, including (but not limited to) miniDV, digital 8 DVD or a solid-state memory card, such as flash memory cards, memory sticks and SD cards. It is also contemplated however, that one or more of these analog or digital recording formats could be incorporated directly with the video camera 18, rather than a remote recorder unit 44. However, for size and weight issues, a solid-state memory card 50 may be one of only a few reasonable options that may incorporate nicely with the video camera 18 directly.

While it is contemplated that a user could activate and control the sighting system from a plurality of controls 48 disposed directly on the recorder unit 44 and/or the video camera 18, it may be preferred that a small remote control unit 52 may be provided with a power switch to turn the video camera on and off. Other controls relating to recording, zoom and range finding functions are also contemplated. In a preferred embodiment, the remote control unit is releasably coupled to the frame 14 of the bows 16 adjacent a user's hand, providing comfortable and convenient access.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A bow sight, comprising:
   a sight frame that may be operatively coupled with a bow;
   a video camera operatively coupled with said sight frame, having forward and rearward end portions, a lens system adjacent said forward end portion, image receiving means optically coupled with said lens system for receiving images of a target from said lens system, and a viewfinder adjacent said rearward end portion; said video camera having an imaging line-of-sight that extends between the target and a user of the bow sight and through the forward and rearward end portions of said video camera; and
   sighting means disposed within said imaging line-of-sight for aiming said bow at said target; said sighting means comprising one or more material sighting structures.

2. The bow sight of claim 1 wherein said sighting means is coupled with said sight frame such that said sight means may be adjustably positioned with respect to said imaging line of sight.

3. The bow sight of claim 2 wherein the forward end portion of said video camera is operatively coupled with the rearward mounting portion of said sight frame so that said video camera may simultaneously receive images of said sighting means and said target.

4. The bow sight of claim 3 wherein said video camera is removably coupled with said mounting frame.

5. The bow of sight of claim 3 wherein said sighting means is comprised of a plurality of sighting pins that are operatively coupled with said sight frame so that they may be adjustably positioned within said imaging line of sight.

6. The bow sight of claim 2 wherein the rearward end portion of said video camera is operatively coupled with the forward mounting portion of said sight frame so that said video camera may receive images of said target that are not obstructed by said sight means.

7. The bow sight of claim 6 wherein said video camera is removably coupled with said mounting frame.

8. The bow of sight of claim 6 wherein said sighting means is comprised of a plurality of sighting pins that are operatively coupled with said sight frame so that they may be adjustably positioned within said imaging line of sight.

9. The bow sight of claim 1 wherein said image receiving means is comprised of at least one charge-coupled device.

10. The bow sight of claim 9 wherein said viewfinder is an LCD display screen that is electrically coupled with said charge-coupled device.

11. The bow sight of claim 10 further comprising memory means for recording images of the target received by said charge-coupled device.

12. The bow sight of claim 11 wherein said memory means and said video camera are separate structures that are electrically coupled with one another.

13. The bow sight of claim 12 wherein said memory means is disposed within a recorder unit, which further contains a power supply for said video camera and said memory means.

14. The bow sight of claim 11 wherein said memory means is integrated with said video camera.

15. The bow sight of claim 1 further comprising a processor, which is electrically coupled with said video camera, software that is operative on said processor to generate images of the target, received by said image receiving means, on said viewfinder, and a range finder electrically coupled with said video camera that is capable of transmitting range-to-target data to said processor.

16. The bow sight of claim 15 wherein said software is further operative on said processor to generate said range-to-target data as a graphic image on top of said images on said viewfinder.

17. The bow sight of claim 15 wherein said lens system is comprised of a zoom lens that may be selectively actuated to magnify images received by said lens system.

* * * * *